United States Patent [19]

Uyeda

[11] 4,117,763
[45] Oct. 3, 1978

[54] KEY DECODING AND DUPLICATING APPARATUS AND METHOD

[75] Inventor: Tim M. Uyeda, South San Gabriel, Calif.

[73] Assignee: Klaus W. Gartner, La Palma, Calif.

[21] Appl. No.: 695,317

[22] Filed: Jul. 8, 1976

Related U.S. Application Data

[63] Continuation-in-part of Ser. No. 582,639, Jun. 2, 1975, Pat. No. 4,012,991.

[51] Int. Cl.² ............................................. B23C 1/16
[52] U.S. Cl. ..................................... 90/13.05; 76/110
[58] Field of Search .................... 90/13.05; 51/165.75, 51/165 TD, 100; 76/110

[56] References Cited

U.S. PATENT DOCUMENTS

| 548,298 | 10/1895 | Darling | 90/13.05 |
|---|---|---|---|
| 1,750,218 | 3/1930 | Falk | 90/13.05 |
| 1,886,641 | 11/1932 | Caron | 90/13.05 |
| 1,923,164 | 8/1933 | Roos | 90/13.05 |
| 3,807,276 | 4/1974 | Oliver | 90/13.05 |
| 3,902,382 | 9/1975 | Lieptz | 90/13.05 |

*Primary Examiner*—Othell M. Simpson
*Attorney, Agent, or Firm*—Poms, Smith, Lande & Glenny

[57] ABSTRACT

Method and apparatus for decoding and duplicating a key wherein the notches in the shank of the key are coded to a predetermined coded depth and spacing therebetween. An index card having a sequential index thereon corresponding to the predetermined coded depth is inserted into a housing and the key to be duplicated is inserted into a slot in the housing where it engages an indexing member which enters one of the notches on the key and indicates on the card the coded depth of that notch. The angle of cut of the same notch may also be determined. The remaining notches of the key may be decoded in like manner. The same index card is then inserted into a housing associated with a grinding wheel. The depth of the cut made by a grinding wheel on the blank key is indicated on the card by a pointer pivotally secured in the housing.

In an alternate embodiment, the same index card is inserted into a housing and the position of the key to be duplicated is calibrated with respect to the grinding wheel. The blank key is located on the housing in a manner related to the coded spacing of the notch to be cut by a visual observation of a first pointer sweeping across the index card. The notch is then cut at the proper location on the key to the coded depth also determined by a visual observation of a second pointer sweeping across the index card. Sequential cuts are made in like manner.

11 Claims, 28 Drawing Figures

U.S. Patent  Oct. 3, 1978  Sheet 2 of 8  4,117,763
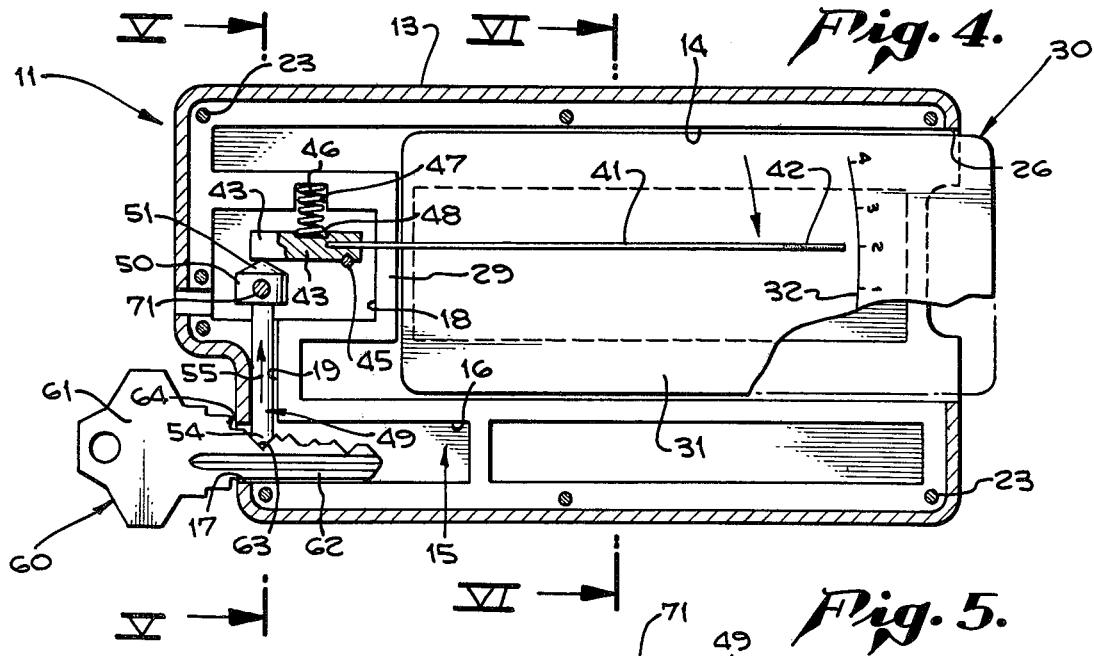
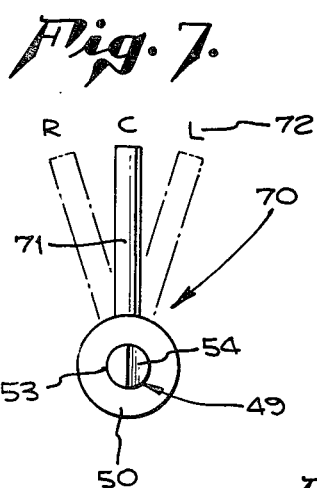
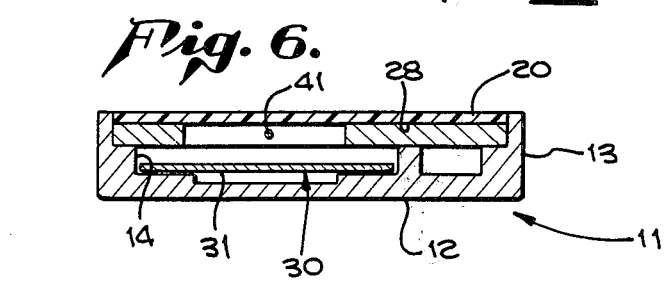
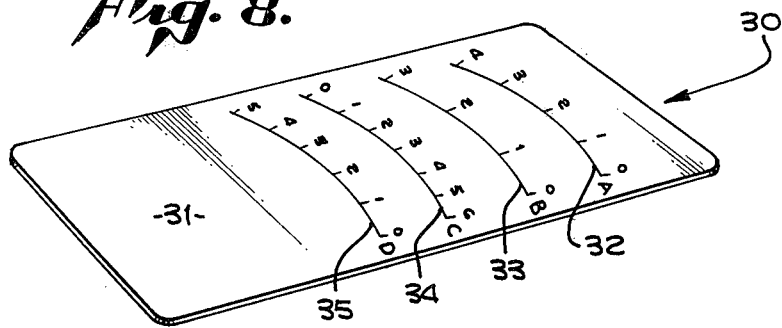

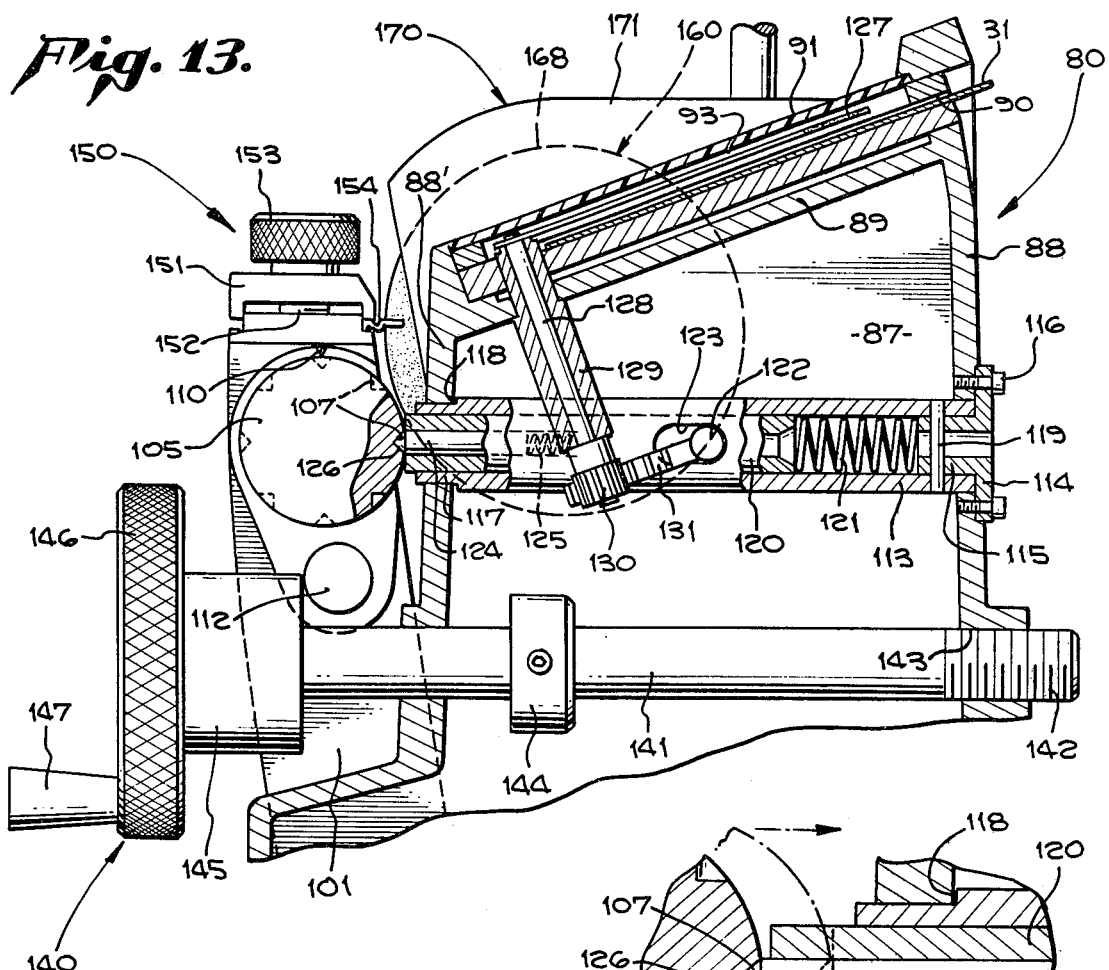
Fig. 13.
Fig. 22.
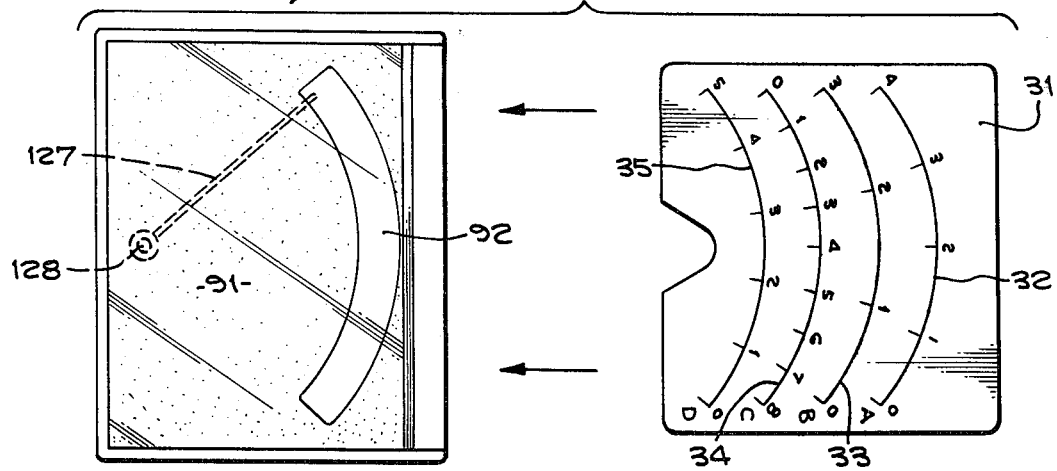
Fig. 14.

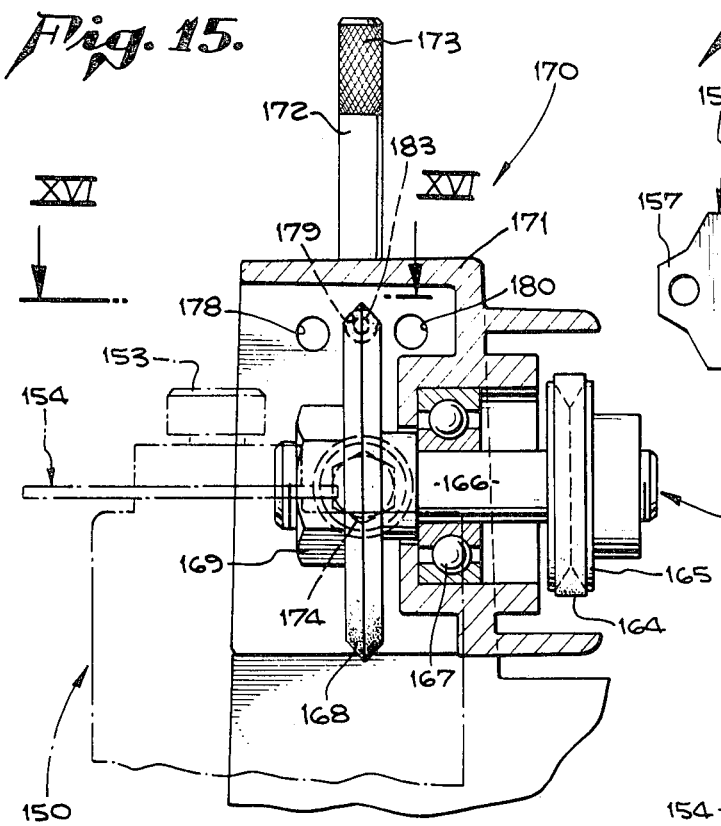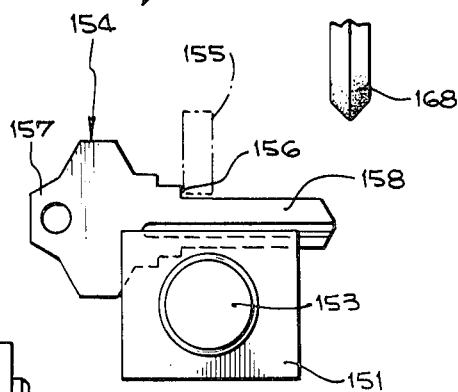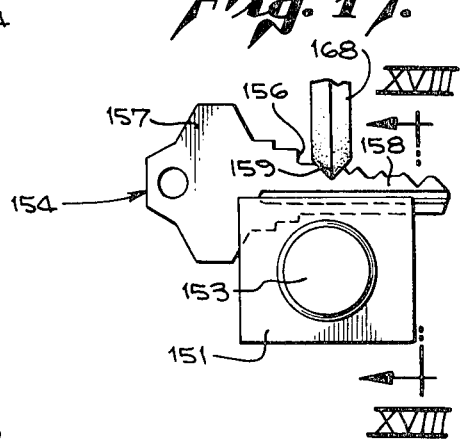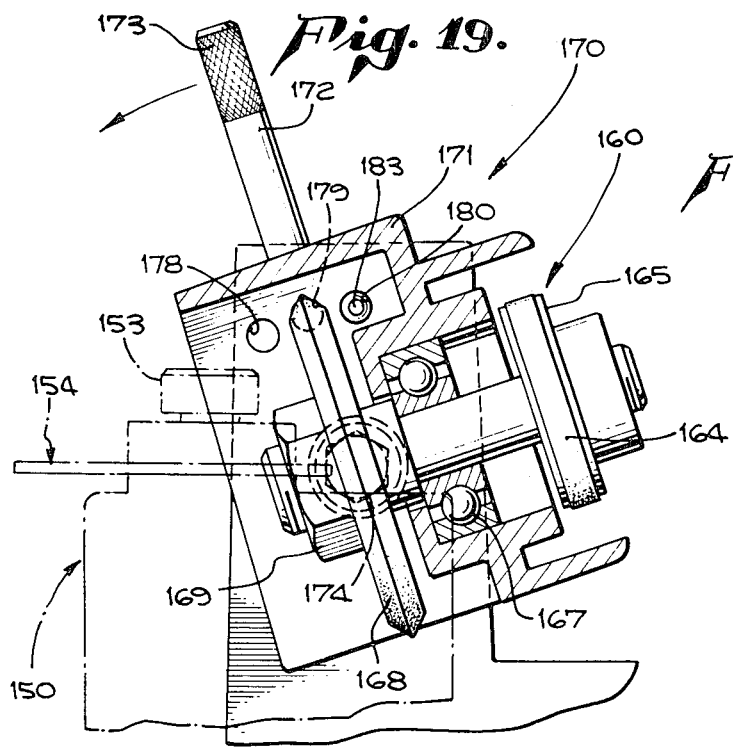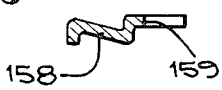

KEY DECODING AND DUPLICATING APPARATUS AND METHOD

CROSS-REFERENCE TO RELATED APPLICATION

This application is a continuation-in-part of application Ser. No. 582,639 filed June 2, 1975 now U.S. Pat. No. 4,012,991.

BACKGROUND OF THE INVENTION

1. Field of the Invention

The invention relates to the duplication of keys; and, more particularly, to key decoding and duplicating means.

2. Description of the Prior Art

It is well known in the key art that keys of one type of manufacture are coded in a predetermined manner. That is, such keys of the type having a plurality of spaced notches of varying depths and spacing therebetween are coded to a predetermined coded depth and spacing therebetween by the manufacturer thereof. This information is generally available to those in the key duplicating trade. In certain instances, such keys have indicia thereon indicating the code of the key. However, it is not desirable to have such information on keys for security reasons or the like. In addition, the notches cut into such keys have differing angles of cut. There is thus a need for means for quickly and easily decoding such keys and determining the angle of cut so that duplicates may be made therefrom.

Another problem is that the key it is desired to duplicate may already be a duplicate key. That is, it may be a duplicate of an original key, a duplicate of a preceding duplicate key, etc.. During previous duplications, tolerances added during the duplicating process may have introduced deviations into the duplicated key whereby it does not exactly fit into the lock for which the key was made. There is thus a need for means that gives a quick and easily approximation of the original coded depth and spacing of the key being duplicated so that, when the key is duplicated, it may be duplicated in a manner more closely approximating the original key.

Finally, once such a key is decoded, there is a need for using such information to duplicate the decoded key on a blank key. Such duplicate key must be cut in a manner whereby the notches cut therein are spaced and of a depth corresponding to the predetermined coded depth and spacing of the original key.

The same angle of cut as in the key being duplicated must be made on the blank key. There is therefore a need for a method and apparatus for quickly and easily duplicating a key once that key is decoded.

SUMMARY OF THE INVENTION

It is an object of this invention to provide method and apparatus for decoding a key having notches thereon of a predetermined coded depth and spacing.

It is a further object of this invention to decode a duplicate key which may have variations built into the duplicate key from the original predetermined coded depth and spacing of the notches therein.

It is still another object of this invention for providing a method and apparatus for duplicating a key once it is decoded in a manner duplicating the original coded spacing and depth of the notches in the key being duplicated.

It is still further an object of this invention to provide a method for decoding a key and duplicating the decoded key.

It is still another object of this invention to determine the angle of cut of the key being duplicated and cut the duplicate key in the same manner.

It is a further object of this invention to provide a method and apparatus for duplicating a previously decoded key using visual observations of the coded spacing and depth of cut of the key being duplicated.

These and other objects are preferably accomplished by providing an index card having a sequential index thereon corresponding to the predetermined coded depth of the key desired to be duplicated. This card is inserted into a housing and the key to be duplicated is inserted into a slot in the housing where it engages an indexing member which enters one of the notches on the key and indicates on the card the coded depth of that notch. The angle of cut of the same notch may also be determined. The remaining notches of the key may be decoded in like manner. The same index card is then inserted into a housing which includes an indexing drum having notches therein with spacing therebetween corresponding to the predetermined coded spacing of the key to be duplicated. A blank key is firmly secured in a predetermined position on the housing and movable in a direction toward a grinding wheel. The indexing drum is indexed corresponding to the predetermined coded spacing between the notches of the key to be duplicated and the blank key is moved into cutting engagement with the grinding wheel. The depth of the cut made by the grinding wheel on the blank key is indicated on the card by a pointer pivotally secured in the housing and the spacing between the notches is determined by the drum operatively engaging an index pin which conformably fits into selected spaced notches on the drum. The pointer is moved across the sequential index on the card to indicate the depth of cut. The same angle of cut of the notches in the key having the notched shank may also be cut in the blank key. When duplicating a key that is already a duplicate of a preceding duplicate or original key wherein deviations from the original coded depth may be present, the original coded depth of the key, that it is desired to duplicate, may be determined before duplicating a key therefrom so that the duplicated key is more accurate than the key from which the duplicate was made.

In an alternate embodiment, the same index card is inserted into a housing and the position of the key to be duplicated is calibrated with respect to the grinding wheel. The blank key is located on the housing in a manner related to the coded spacing of the notch to be cut by a visual observation of a first pointer sweeping across the index card. The notch is then cut at the proper location on the key to the coded depth also determined by the visual observation of a second pointer sweeping across the index card. Sequential cuts are made in like manner.

BRIEF DESCRIPTION OF THE DRAWING

Figures 1, 2, 3:
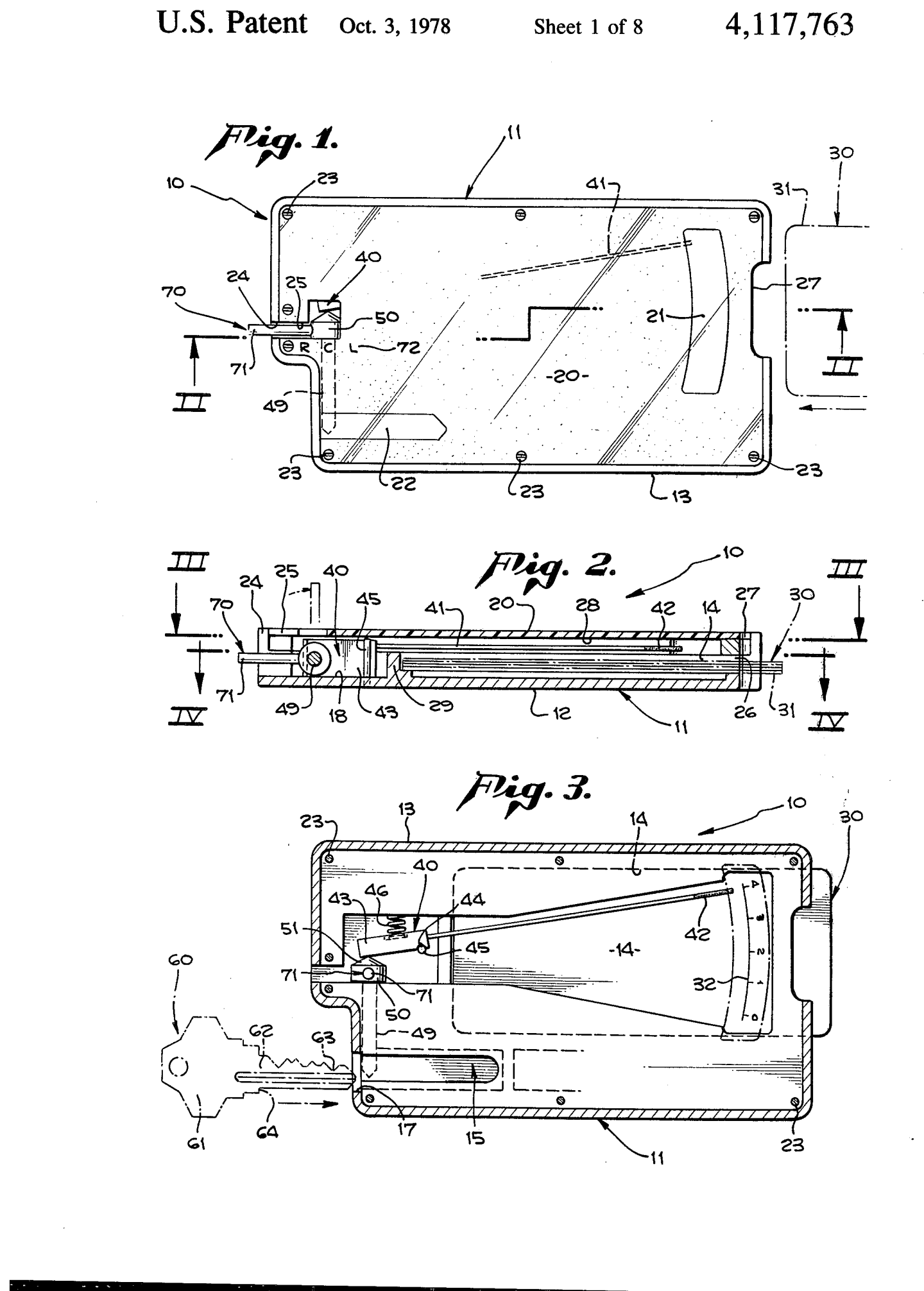

FIG. 1 is a top plan view of decoding means for carrying out the apparatus and method of the invention;

FIG. 2 is a view taken along lines II—II of FIG. 1;

FIG. 3 is a view taken along lines III—III of FIG. 2;

FIG. 4 is a view taken along lines IV—IV of FIG. 2;

FIG. 5 is a view taken along lines V—V of FIG. 4;

FIG. 6 is a view taken along lines VI—VI of FIG. 4;

FIG. 7 is a view taken along lines VII—VII of FIG. 5 with parts thereof omitted for convenience of illustration;

FIG. 8 is a perspective view of indicia bearing names in accordance with the invention;

FIG. 13 is a view taken along lines XIII—XIII of FIG. 10;

FIG. 14 is a view taken along lines XIV—XIV of FIG. 9 with portions thereof omitted for convenience of illustration and showing indicia bearing means about to be inserted into the apparatus of FIG. 9;

FIG. 15 is a view taken along lines XV—XV of FIG. 11;

FIG. 16 is a view taken along lines XVI—XVI of FIG. 15 with parts thereof omitted for convenience of illustration;

FIG. 17 is a view similar to FIG. 16 showing the key being cut;

FIG. 18 is a view taken along lines XVIII—XVIII of FIG. 17 showing a straight angle of cut on the key, parts thereof being omitted for convenience of illustration;

FIG. 19 is a vertical detailed view, partly in section, similar to FIG. 15 showing an alternate position of a portion of the apparatus of FIGS. 9 through 13;

FIG. 20 is a detailed view, similar to FIG. 18 showing a left angle cut on the key of FIG. 17;

FIG. 21 is a detailed view, similar to FIGS. 18 and 20, showing a right angle cut on the key of FIG. 17;

FIG. 22 is a detailed view showing a detail of the indexing means for duplicating a key;

DESCRIPTION OF THE PREFERRED EMBODIMENT

Figure 9:
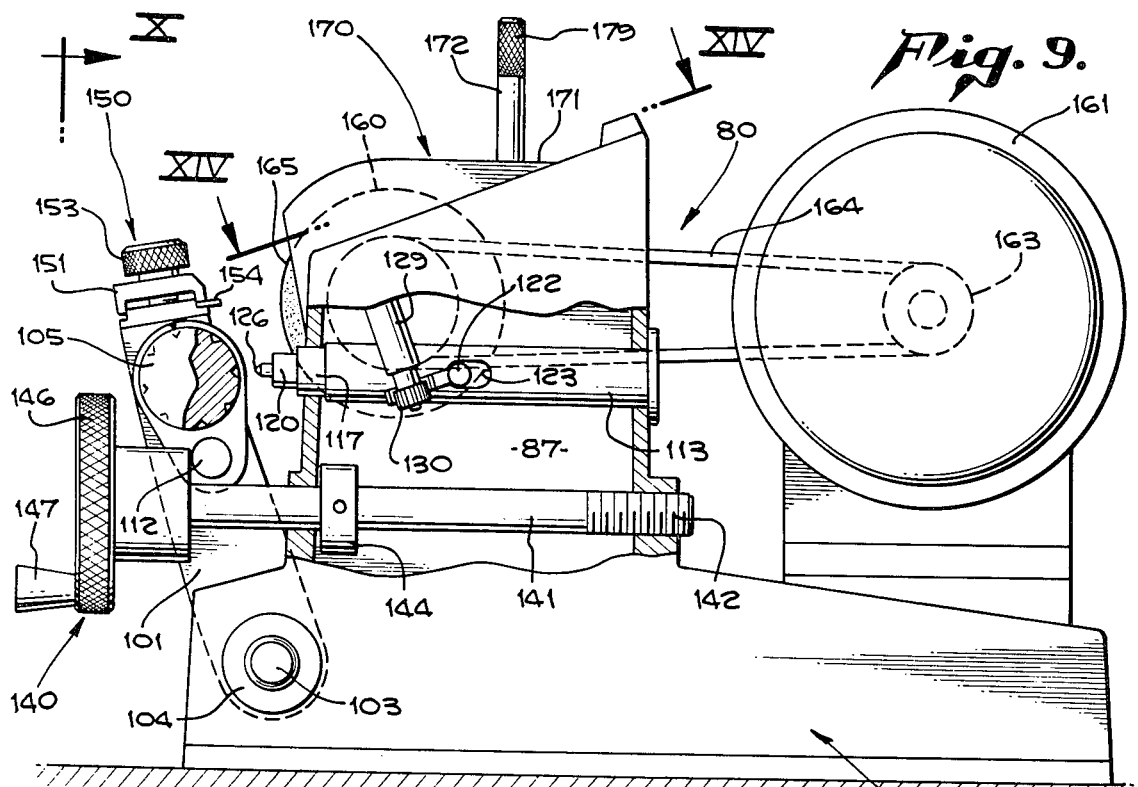
FIG. 9 is a vertical, partly sectional, view of duplicating apparatus for carrying out the apparatus and method of the invention.

Referring now to the drawings, FIGS. 1 through 22 disclose apparatus for carrying out the method of the invention wherein a key may be decoded and a duplicate key made from the decoded information. FIGS. 1 through 8 disclose apparatus for carrying out the apparatus and method for decoding a key. FIGS. 9 through 22 disclose apparatus for carrying out the apparatus and method for duplicating a decoded key. A portion of the apparatus of FIGS. 1 through 8, shown in detail in FIG. 8 also forms a part of the apparatus of FIGS. 9 through 21.

Thus, referring more particularly to FIGS. 1 through 4, as particularly contemplated in the present invention, decoding means 10 is shown for decoding a key from which a duplicate is desired to be made. As will be discussed, the key to be duplicated is a standard key having a head and a shank having a plurality of spaced notches therealong. Such notches may extend along only one or both sides of the shank and the techniques of my invention are applicable to both types. Further, the key to be decoded is of a particular type or of a certain manufacturer who provides keys having notches of predetermined coded spacing and depths. Thus, either the coded key-type is known beforehand or the manufacturer thereof. These coded depths have no relation to any actual measurements; i.e., the coded depth alone does not indicate the actual depth.

Such information is generally available to those in the key duplicating art. Accordingly, decoding means 10 includes coded indicia bearing means 30 in the form of a plurality of index cards, such as the card shown in FIG. 8, which card may have coded information recorded thereon relating to one or more coded key-types. This will be explained more in detail hereinbelow.

Also, as particularly contemplated in the present invention, decoding means 10 includes housing means 11 for receiving the indicia bearing means 30 and the key to be decoded; key receiving means 15 in the housing for receiving the notched shank portion of the key to be decoded therein; and coded notch depth indicating means 40 for indicating the coded depth of the notches in the key being decoded.

In addition, it is well known that the notches that are cut in the shanks of keys such as that illustrated in FIG. 3 are cut at various angles. Thus, as particularly contemplated in the present invention, decoding means 10 further includes angle-of-cut indicating means 70 for indicating the angle of cut in the notch being decoded.

FIGS. 9 through 22, as heretofore discussed, as particularly contemplated in the present invention, illustrate duplicating means 80 for duplicating a key decoded as will be discussed with respect to FIGS. 1 through 8. In addition to the aforementioned coded indicia bearing means 30, duplicating means 80 includes housing means 81 for receiving the indicia bearing means 30 therein; blank key holding and positioning means 150 for positioning and holding a blank key in a predetermined position prior to cutting notches therein; notch cutting means 160 for cutting notches in the blank key; key moving means 140 for moving the blank key into cutting engagement with the cutting means 160; and indexing means 100 for indexing the predetermined coded spacing between the notches being cut in the blank key. Further, the duplicating means 80 may also include angle-of-cut indexing means 170 to index the predetermined angle of cut of the notches to be made on the blank key.

Accordingly, referring once again to FIGS. 1 through 4, decoding means 10, in the exemplary embodimennt of the invention, includes housing means 11 which may be formed of one or more sections and of any suitable material, such as plastic, cast aluminumm, etc. Thus, housing means 11 includes a base 12 (see FIG. 2) and a peripheral side wall 13. The base 12 may be formed from a solid piece having hollowed-out portion to form an inner cavity 14 (see particularly FIG. 6) of a width suitable to receive the indicia bearing means 30 therein, and, as shown in FIG. 4, to form key receiving means 15 in the form of a slot 16 communicating with an opening 17 in the peripheral wall 13. A cavity 18 smaller than cavity 14 is also formed on base 12 (see FIG. 4) and, as will be discussed, communicates with slot 15 through a slot 19. A generally opaque cover 20 closes off the entire base 12 and wall 13 to form a compact, easily and economically manufactured unitary structure. For reasons to be discussed, cover 20 may include clear or transparent windows 21 and 22 and be secured to wall 13 or sections of base 12 by suitable screws 23 or the like. In addition to opening 17 in wall 13, a small opening 24 is formed in wall 13 (see FIG. 1) and communicates with an L-shaped opening 25 in cover 20 for reasons to be discussed. An opening 26 (see FIGS. 2 and 4) wide enough to receive indicia bearing means 30, as will be discussed, therein is also formed a wall 13 communicating with cavity 14. As shown in FIGS. 1 and 3, cover 20 may be partly relieved as at portion 27 above opening 26 to assist in inserting the indicia bearing means 30.

As discussed, decoding means 10 includes indicia bearing means 30 in the form of an index card 31 (see FIG. 8) which includes indicia thereon relating to the coded notch depths of various key-types. For example, the legends A through D may indicate four differing types of keys. Each arcuate lines 32 through 35 indicates a sequented index of that particular key-type. For example, Row A indicates a key that is coded from zero to four, this indicating the known coded depths of the notches on keys offered by the "A" manufacturer. Such indicia may progress from the left to right or right to left depending on the manufacturer. Thus, each index card 31 may have one or more coded depths recorded thereon. Also, as shown in FIG. 2, slot 26 and cavity 14 may be wide enough and deep enough to receive a stack of cards 31, if desired.

As shown in FIG. 1, a card 31 is shown in phantom about to be inserted in slot 26 and into cavity 14. As shown in FIGS. 3 and 4, card 31 is inserted into cavity 14 until the desired row or line 32 is visible in window 21. It can be seen that Row A on card 31 in FIG. 8 is visible in window 21 in FIG. 3. If card 31 were pulled out to the right in FIG. 3, subsequent Rows B through D would then be visible. Thus, the coded information relating to the type of key to be decoded is placed in window 21.

It can be seen in FIG. 2 that a spacing is formed between the undersurface 28 of cover 20 and the top of the inner wall 29 forming cavity 14 of housing means 11. Cards 31 abut against wall 29 as shown in FIG. 2. However, decoding means 10, in the exemplary embodiment of the invention, includes coded notch depth indicating means 40. Means 40, as shown in FIG. 3, includes an elongated dial or pointer 41 which may be colored or the like at tip 42 and which is adapted to sweep across line 32. As can be seen in FIG. 2, pointer 41 moves across the spacing between cover 20 and wall 29. As shown in FIG. 3, the pointer 41 is fixedly secured to a block member 43 having a notch 44 pivotal about a pin 45 securely mounted in housing means 11 (see FIG. 2). A spring 46 is securely mounted at one end in a cavity 47 formed in a portion of inner wall 29 (see FIG. 4) and has its free end disposed in a cavity 48 in block member 43.

Indicating means 40 further includes a pin member 49 having a main head portion 50 which includes a tapered portion 51 adapted to abut against the underside 52 of block member 43 as shown in FIGS. 3 and 4. Pin member 49 further includes a downwardly extending portion 53 terminating in an end portion 54 which, as shown in FIGS. 3 and 4, is tapered so as to conformably fit into the notches in a key 60. As indicated by the arrow 55 in FIG. 4, pin member 49 is adapted to move up and down in slot 19 and retained therein by the walls forming slot 19.

Before discussing the remaining inventive features of the decoding means 10 of FIGS. 1 through 8, for purposes of description, key 60, as shown in FIGS. 3 and 4, will be described. It is to be understood that key 60 is of a standard type having an apertured head 61 and an integral shank 62. Shank 62 has a plurality of spaced notches 63 of varying depths and spacing therebetween. Key 60 also has a stop or shoulder 64 between the head 61 and shank 62. Although notches 63 are disposed only along one side of shank 62, obviously such notches may be disposed on both sides and the invention disclosed herein is applicable to both.

In operation, card 31 is inserted into housing means 11 as heretofore described. Key 60, which is to be decoded, is inserted through opening 17 into slot 15 (which slot and opening forms the key receiving means 15) until shoulder 64 abuts against the portions of side wall 13 forming slot 17 as shown in FIG. 4. During such insertion, pin member 49 is moved in the direction of arrow 55 in FIG. 4 and tapered portion 51 abutting block member 43 moves member 43 against spring 46 to thereby move indicator 41 which sweeps across line 32. The window 22 enables the user to view the key shank 63 in the slot 15. Also, as key 60 is inserted into the slot 16, the end portion 54 enters the first notch 63, (i.e., the notch 63 closest to head 61) in the shank 62 of key 60 as shown in FIG. 4. The tip 42 of pointer 41 indicates the position on line 32 related to the coded depth of that notch 63 (i.e., a No. 2 depth of the A type key) as shown in FIG. 4. This information may be recorded and the key 60 sequentially moved to the left in FIG. 4 to thereby decode the remaining notches 63 in like manner. The shank 62 of key 60 is of course visible through window 22.

As heretofore discussed, decoding means 10, as particularly contemplated in the present invention, includes angle of cut indicating means 70 for indicating the angle of cut of the notches 63 decoded in key 60 as discussed hereinabove. Thus, in the exemplary embodiment of the invention, such indicating means 70 includes an indicating member 71, such as a pin, fixedly secured to head portion 50 of pin member 49 as shown in particular in FIGS. 1 and 5. Member 71 is movable within the opening 25 and out of housing means 11 as shown in FIG. 5. Indicia 72, as shown in FIG. 1, may be provided on cover 20 (or on the inner wall 29 visible through cover 20) to indicate a right angle cut (R), a left angle cut (L) and a straight angle cut (C). This is clearly shown in FIG. 7. When end portion 54 conformably fits into each notch 63 in shank 62, the indicating member 72 will move within opening 25 to either one of these three positions, depending upon the angle of cut of each notch. If the notch has a normal or straight cut, member 71 will assume the central or C position. If the cut of the notch is to the right, it will assume the right or R position and, if to the left, it will assume the left or L position. Thus, the angle of the cut can be determined for each notch and recorded along with the coded depth of cut.

Referring now to FIGS. 9 through 22, duplicating means 80 are illustrated for duplicating a key that has been decoded as discussed hereinabove with respect to FIGS. 1 through 8. As particularly contemplated on the present invention, duplicating means 80 includes housing means 81 for housing the various components. In the exemplary embodiment of the invention, housing means 81 includes a base 82 (see FIG. 12) which may include an upper wall portion 83 and downwardly extending side walls 84 terminating in legs 85 thus forming an inner space 86.

Figure 10:
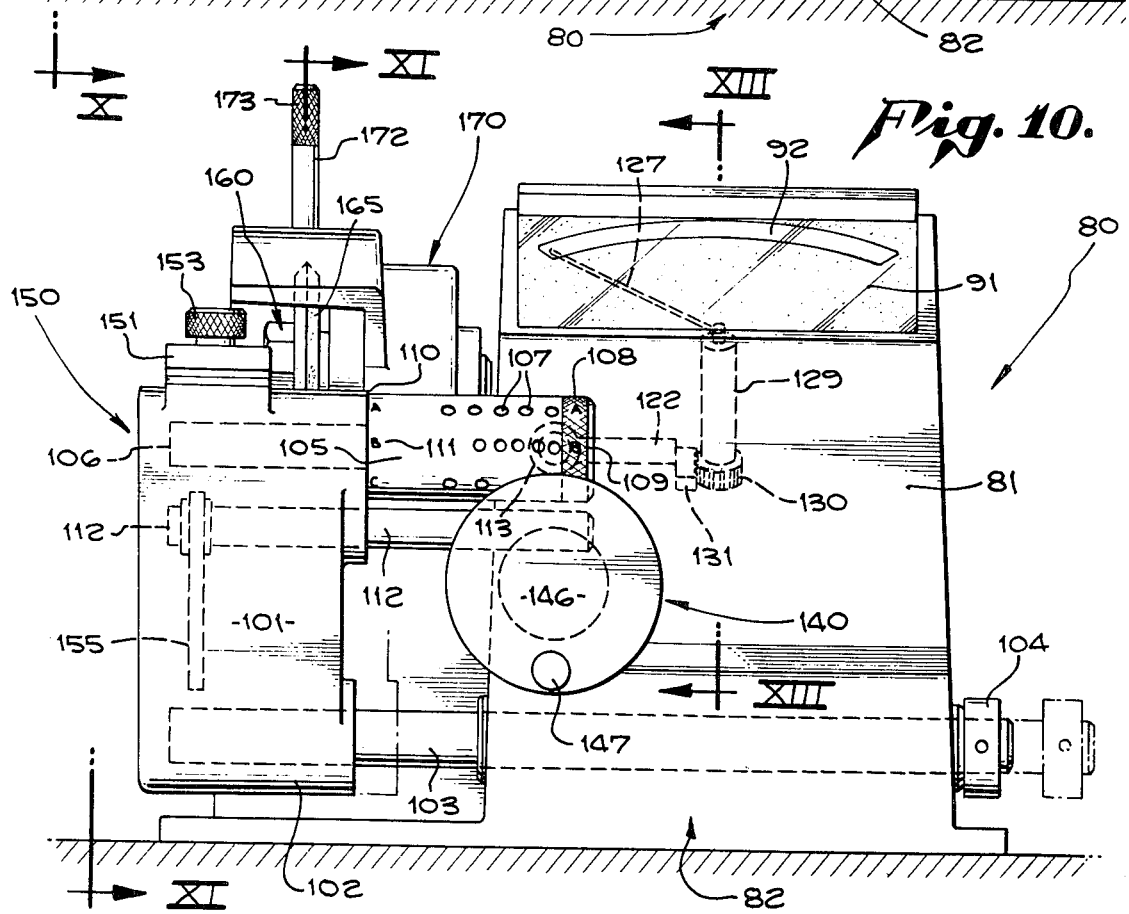
FIG. 10 is a view taken along lines X—X of FIG. 9.
Figure 12:
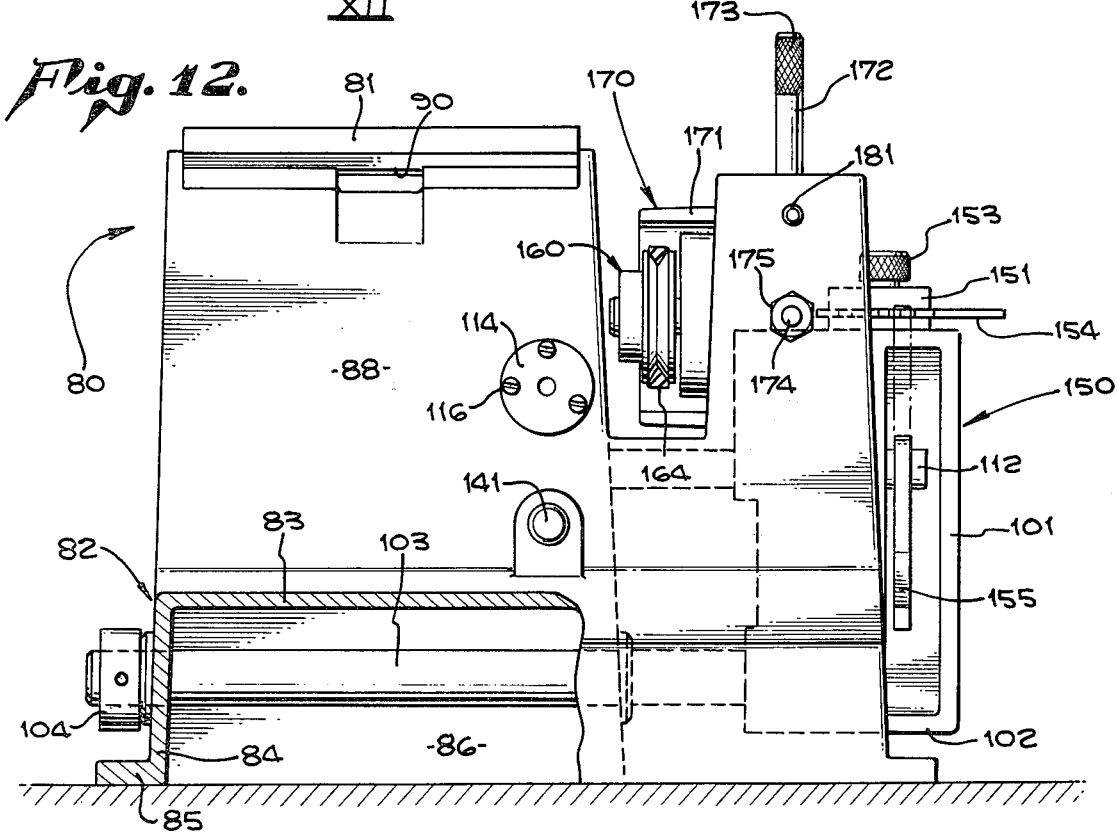
FIG. 12 is a view taken along lines XII—XII of FIG. 11.

Duplicating means 80 further includes indexing means 100 including a main body portion 101 (FIG. 9) having an apertured lower end 102 receiving a shaft 103 therethrough. As shown in FIGS. 10 and 12, shaft 103 extends across the space 86 of housing means 81 and out one side thereof and terminates in a stop member 104. Body portion 101 is pivotally mounted on shaft 103. An indexing drum 105 is rotatably mounted on a shaft 106 secured to main body portion 101 and includes a plurality of aligned rows of spaced notches 107 (see FIG. 10). A knurled knob 108 may be provided on drum 105 for ease in rotating drum 105. Indicia 109 (such as A, B & C) may be provided on knob 108 (or drum 105) corresponding to the rows (32 through 35) A through D of card 31 of FIG. 8 for reasons to be discussed. It is to be understood that all of the notches 107 in one aligned row are coded to the spacing of the type of key related to that particular row. That is, Row A in FIG. 8 relates to one predetermined coded depth of notches in one key type and the spacing between the notches 107 in Row A of FIG. 10 corresponds to the coded spacing between notches of the same key type. Further, indicia 110, such as an indicating arrow or the like, may be provided on main body portion 101 which corresponds with indicia 111 on indexing drum 105 (FIG. 10).

Indexing means 100 further includes a bar 112 fixedly mounted on main body portion 101. As can be seen in FIG. 10, bar 112 extends the full length of drum 105 and is spaced therefrom for reasons to be discussed.

Housing means 81 further includes a housing section 87 having a hollow interior and formed by upstanding side walls 88 and a top wall 89 (see particularly FIG. 13) integral with upper wall portion 83. Indexing means 100 further includes a fixed hollow sleeve member 113 mounted in side walls 88 fixed at one end in side wall 88 by a suitable flange member 114 having a sleeve portion 115 fitting into sleeve member 113 and secured to wall 88 by screws 116 or the like. The opposite end of sleeve member 113 extends through an opening 117 in side wall 88' and has a shoulder 118 abutting the walls surrounding opening 117. A pin member 119 extends through sleeve mmember 113 and sleeve portion 115 to prevent rotation thereof.

A movable sleeve 120 is slidably mounted within sleeve member 113 and a spring 121 is disposed within sleeve member 113 and the sleeve portion 115 of flange member 114. A post 122 is fixed to sleeve 120 and extends out of sleeve member 113 through a slot 123. It can be seen in FIG. 13 that the slot 123 limits the movement of post 122. An indexing pin 124 is slidably mounted within sleeve 120 and is biased toward indexing drum 105 by a spring 125 within sleeve 120. Indexing pin 124 terminates in a tapered end portion 126 conforming to the notches 107 as shown in FIG. 13. Also, as shown in FIG. 22 and to be heretofore described, the drum 105 is adapted to be moved to a position whereby end portion 126 of pin 124 enters an aligned notch 107, with end portion 126 spaced from sleeve 120 and extending outwardly thereof as also shown in FIG. 9, then drum 105 is moved from the solid line position in FIG. 22 to its dotted line position whereby drum 105 abuts against sleeve 120 (this is the final position prior to cutting a blank key as will heretofore be described).

Housing means 81 further includes a slot 90 formed in the top wall 89 for receiving the coded indicia bearing index card 31 of FIG. 8 therein (see FIG. 14). An opaque cover 91, having a transparent window 92, closes off the top wall 89 (see also FIG. 14) and is spaced from slot 90 to form a space 93 therebetween.

Indexing means 100 further includes a pointer 127 movable within space 93 and fixedly secured at one end to a pivot shaft 128 rotatably mounted in a sleeve 129 fixedly secured at one end to wall 89. Shaft 128 extends out of sleeve 129 and terminates in a gear 130 (see FIGS. 10 and 13) which meshes with a gear rack 131 fixedly secured to post 122 (see particularly FIG. 13).

Duplicating means 80, as particularly contemplated in the present invention, includes key moving means 140 for moving a blank key into cutting engagement with the aforementioned notch cutting means.

In the exemplary embodiment, such key moving means 140, as particularly shown in FIG. 13, includes a shaft 141 threaded at one end 142 in a threaded aperture 143 in side wall 88 of housing means 81. A stop member 144 is fixedly secured to shaft 141 and adapted to abut against side wall 88' when shaft 141 is rotated. Shaft 141 extends past side wall 88' and terminates in an enlarged sleeve member 145 which abuts against bar 112 as seen in FIG. 13. A knurled knob 146 is fixedly secured to sleeve member 145 and may have a handle 147 thereon to assist in rotating shaft 141. As clearly shown in FIG. 13, rotation of shaft 141, via knob 146 and handle 147, moves sleeve member 145 against bar 113 which also moves drum 105 into engagement with indexing pin 124.

Duplicating means 80, as particularly contemplated in the present invention, further includes blank key positioning and holding means 150 for holding a blank key in a predetermined position for cutting by the notch cutting means 160. In the exemplary embodiment of the invention, blank key positioning and holding means 150 includes a movable clamping plate 151 (see FIGS. 11 and 13) having a threaded bolt 152 extending therethrough, bolt 152 being fixedly mounted in main body portion 101 of indexing means 101. A knob 153 is threaded on the upper end of bolt 152 so that, as knob 153 is threaded on bolt 152, plate 151 is clamped against body portion 101 to thereby clamp a blank key 154 therebetween. Blank key positioning and holding means 150 also includes, in the exemplary embodiment, means for positioning blank key 154 prior to cutting. Thus, means 150 includes a key positioner arm 155 pivotally mounted at one end on bar 12 (see particularly FIG. 10) and movable from a position out of engagement with blank key 154 (solid lines in FIG. 11) to a position engaging arm 155 (dotted lines in FIG. 11). This is also shown in FIG. 16. That is, blank key 154 includes a shoulder 156 between the head 157 and shank 158 thereof. In the "up" or FIG. 16 position (also the dotted line position in FIG. 11), key 154 is moved between plate 151 prior to clamping until arm 155 abuts against shoulder 156. The key 154 is then clamped and arm 155 is pivoted to the solid line position in FIG. 11.

Duplicating means 80 further includes notch cutting means 160 for cutting a notch in blank key 154. In the exemplary embodiment as shown particularly in FIG. 11, notch cutting means 160 includes a motor 161 having a rotatable shaft 162. A pulley 163 is fixedly secured to shaft 162 and an endless drive belt 164 is mounted on pulley 163. The belt 164 encircles a pulley 165 secured to a shaft 166 rotatable mounted on housing means 80 via bearing means 167 (see FIG. 15). A grinding wheel 168 is fixed for rotation with shaft 168 via pulley 165 via its connection to shaft 166 through nut 169 and oriented to be in cutting position when blank key 154 is moved as discussed hereinabove (see particularly FIGS. 11 and 13).

Figure 11:
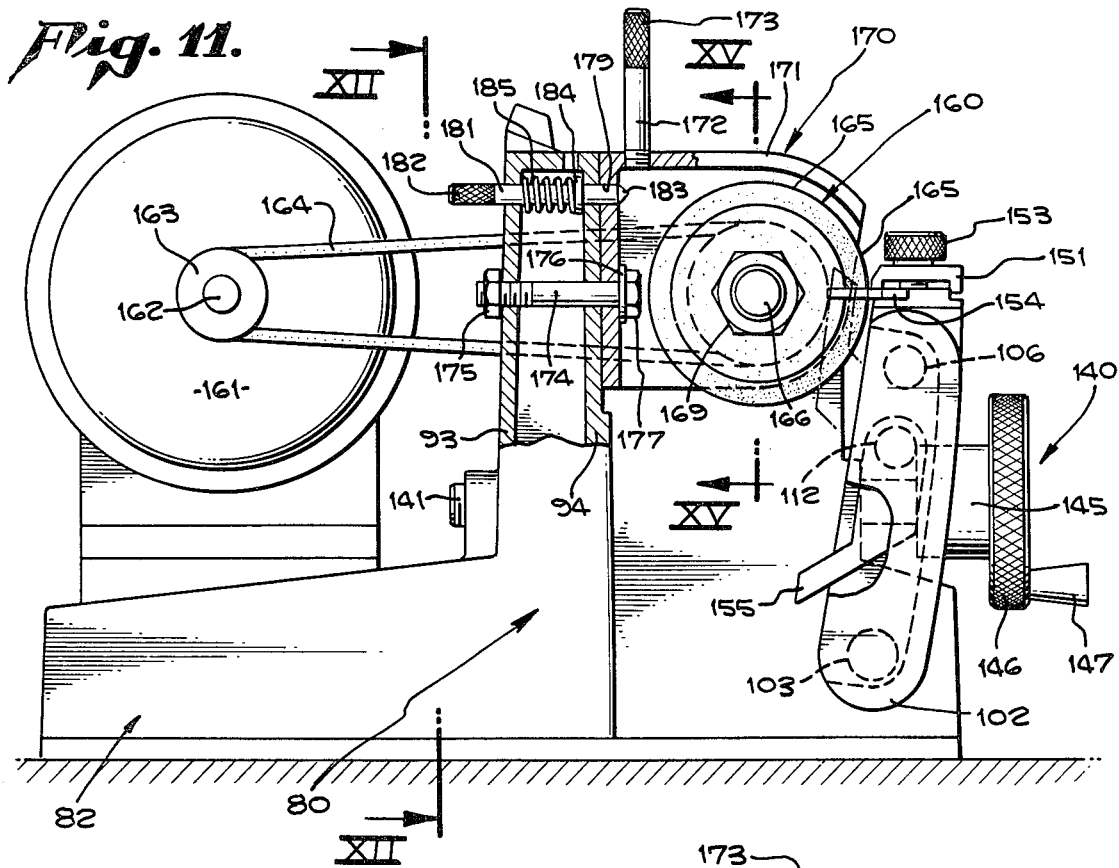
FIG. 11 is a view taken along lines XI—XI of FIG. 10.

As discussed hereinabove, duplicating means 80 may optionally include angle-of-cut indexing means 170 for indexing either a straight, right or left angle of cut onto blank key 154. As shown in FIGS. 18, 20, and 21, these three types of cuts made on the shaft 158 of blank key 154 are illustrated. FIG. 18 shows a straight or center cut 159, FIG. 20 illustrates a cut to the left or a "left" cut 159' and FIG. 21 illustrates a cut to the right or a "right" cut 159'. It is to be understood that various key manufacturers use these different angles of cuts which type may have been previously determined as discussed hereinabove with respect to FIGS. 1 through 8. Thus, as particularly contemplated in the present invention, duplicating means 80 may include angle-of-cut indexing means 170 which, in the exemplary embodiment, as particularly shown in FIGS. 15 and 19, includes the housing 171 for grinding wheel 168 being pivotally mounted on upstanding spaced wall portions 93 and 94 on housing means 81. As shown in FIG. 11, a handle 172, terminating in a knurled end 173, is fixedly secured to housing 171. A pivot bolt 174 interconnects housing 171 to wall sections 93 and 94. Bolt 174 extends through and is rotatable in aligned openings in housing 171 and wall sections 93 and 94 are threaded at the end passing through wall section 93 and secured thereto by nut 175. A lock washer 176 may be disposed between bolt head 177 and the inner wall of housing 171.

As shown in FIG. 15, three linearly aligned apertures 178, 179 and 180 extend through housing 171 and, as shown in FIG. 11, apertures 178 through 180 are aligned with like apertures in the spaced wall sections 93, 94 of housing means 81. A lock pin 181 extends through the aligned apertures in wall sections 93, 94 aligned with one of the apertures in housing 171 (aperture 179 in FIG. 11). Pin 181 extends past wall section 93 and terminates in a knurled end 182. The other end is tapered, as at end 183, for ease in insertion into apertures 178 through 180. A sleeve 184 is fixed to pin 181 between the wall sections 93, 94 and a spring 185 encircles pin 181 between wall section 93 and sleeve 184. It can be seen in FIG. 11 that, by grasping pin 181 via end 182, the pin 181 may be pulled against the bias of spring 185 and the end 183 pulled out of the aligned apertures in wall section 94 and housing 171 (the spacing between wall section 93, 94 being greater than the length of the portion of pin 181 within the apertures in wall section 94 and housing 171). Since housing 171 is now free to pivot about pivot bolt 174, the housing 171 may be moved by handle 172 from the FIG. 15 position (relating to a straight or center notch cut as shown in FIG. 18) or to either a right or left cut only one of these positions being illustrated in FIG. 19). Thus, the positions of apertures 178 through 180 are predetermined so that wheel 168 will make either a straight, left or right angle of cut during cutting.

Although various phases of operation for duplicating a key have been heretofore described with respect to the various individual features thereof, a summary of the key duplicating operations is as follows. Housing 171 is pre-set via locking pin 181 prior to cutting depending on the predetermined angle-of-cut to be made. A blank key 154 is positioned as shown in FIG. 11 using positioner arm 155 to position the key and clamping plate 151 to correctly clamp and align the key prior to cutting. Arm 155 is then moved out of position. The proper notch spacing on drum 105 is selected as heretofore described with respect to FIGS. 1 through 8 and the index card 31 related to the decoded key as discussed with respect to FIGS. 1 through 8 is inserted into slot 90 as shown in FIGS. 13 and 14. As shown in FIG. 22, knob 146 is rotated whereby sleeve member 145 abuts against bar 112 and moves one of the notches 107 into engagement with end portion 126 of pin 124. Continued rotation of knob 146 is made until movable sleeve 120 abuts against drum 105 (see FIG. 13). The pointer 127 will now indicate the initial or starting position of the selected line, such as line 32 or sequential index A, on card 31. The motor 161 is started and wheel 168 is rotated. The cutting of a notch in blank key 154 is illustrated in FIG. 17. Knob 146 is rotated and the notch is cut until pointer 127 sweeps across Row A on card 31 in FIG. 14 until the proper predetermined depth-of-cut is indicated. This is accomplished by sleeve 120 (FIG. 13) moving within sleeve member 113 and thus moving post 122 and pivoting shaft 128 through the meshing of gear rack 131 on post 122 with the gear 130 of shaft 128. In this manner, the proper angle-of-cut and depth of cut may be made in the shank 158 of blank key 154 as shown in FIG. 17.

It can be seen from the foregoing that I have disclosed a quick and easy apparatus and method for decoding both the depth of notch cut and the angle of notch cut of a key, then, using such information, quickly and easily duplicating such key. With my method and apparatus, any deviations that have entered into the key being duplicated, such as when duplicating a duplicate key where tolerances may have been introduced, may be compensated for and the duplicate key made in accordance with my invention will be more accurate than the key from which the duplicate was made.

Referring now to FIGS. 23 through 28, a second embodiment of key duplicating means 200 is illustrated for duplicating a key that has been decoded as discussed hereinabove with respect to FIGS. 1 through 8. In FIGS. 9 through 22, duplicating means 80 includes indexing means 100 for indexing the coded depth and spacing on the key being duplicated. As will be discussed, key duplicating means 200 provides means for visually observing the coded depth and spacing as the blank key is being cut without the necessity of indexing such coded depth and spacing on indexing means 100 as in the FIGS. 9 through 22 embodiment.

Figure 23:
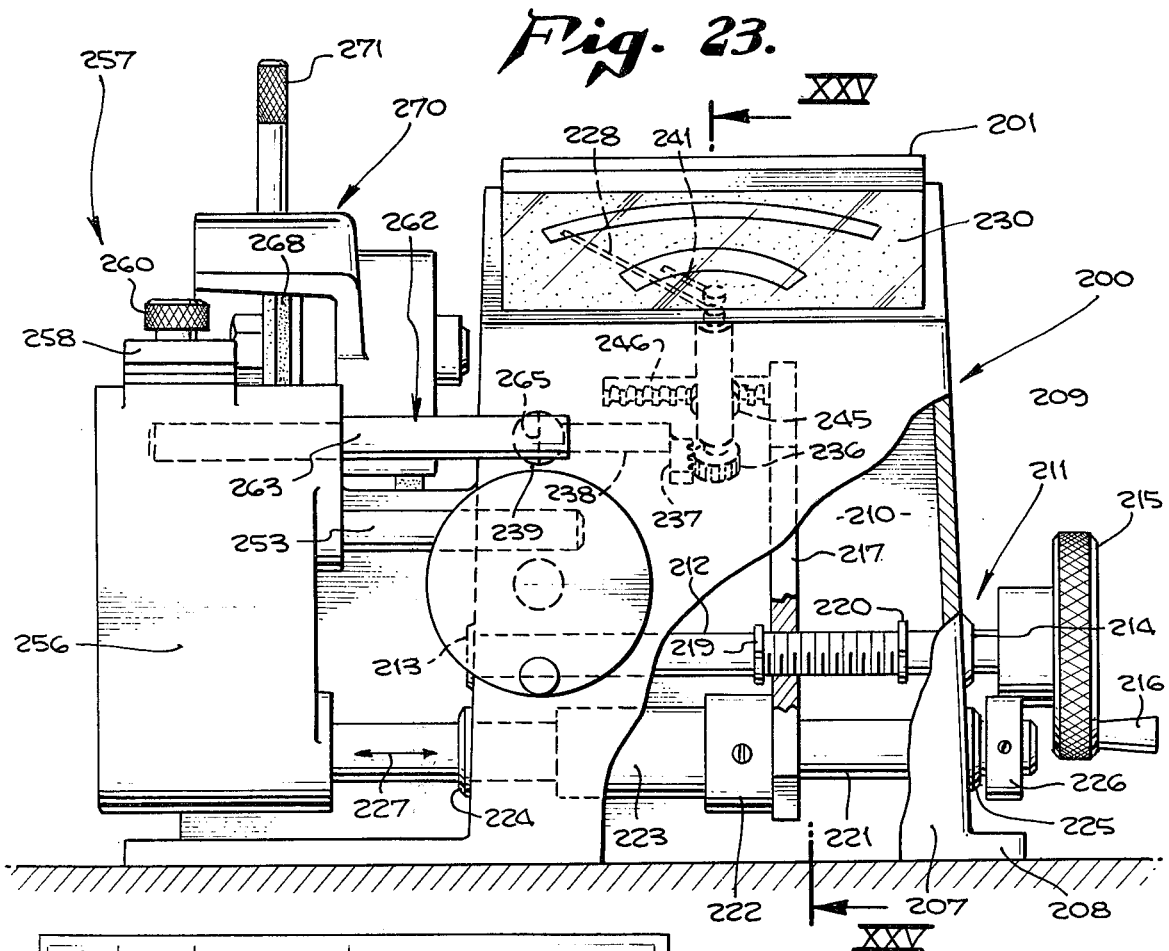
FIG. 23 is a vertical view of an alternative embodiment of key duplicating apparatus for duplicating a key.
Figure 24:
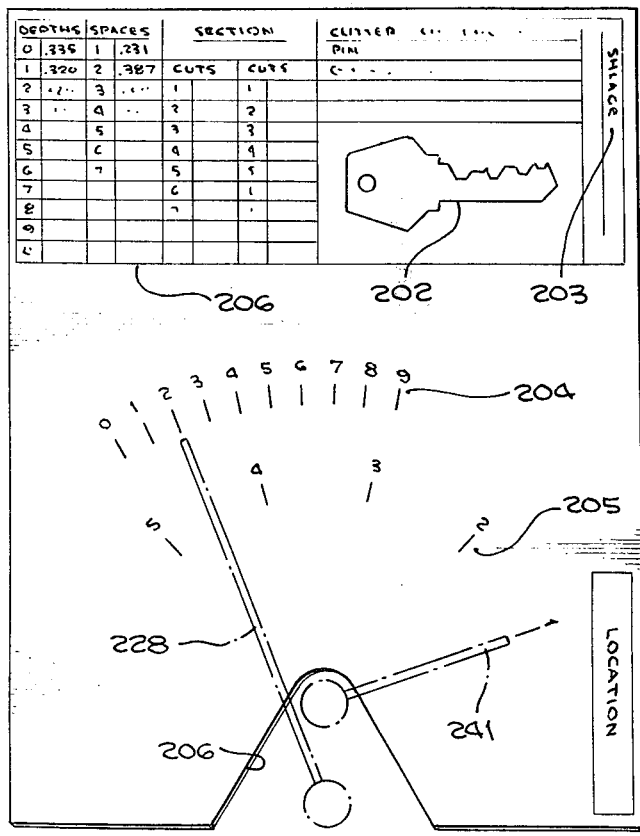
FIG. 24 is a top plan view of an indicia bearing card used in the apparatus of FIG. 23 showing, in dotted lines, a portion of the apparatus thereof.

In FIG. 23, key duplicating means 200 receiving indicia bearing means in the form of an index card 201 therein (see also FIG. 24). Card 201 may be provided for recording thereon the information derived from decoding a key as discussed hereinabove with respect to FIGS. 1 through 8.

Thus, in FIG. 24, index card 201 includes thereon a representation 202 of the key being duplicated and the name 203 of the manufacturer. The coded depths and spacings are provided in arcuate arrays 204, 205 respectively. A notch 206 is cut out of the bottom of card 201 to straddle a portion of the apparatus 200, as will be discussed, to properly align the card 201 in apparatus 200. The upper portion of card 201 may include a box 206 having the actual dimensions for the coded depth and spacing, in addition to the replica of the key and the name of the manufacturer, and any other desired pertinent information.

Figure 25:
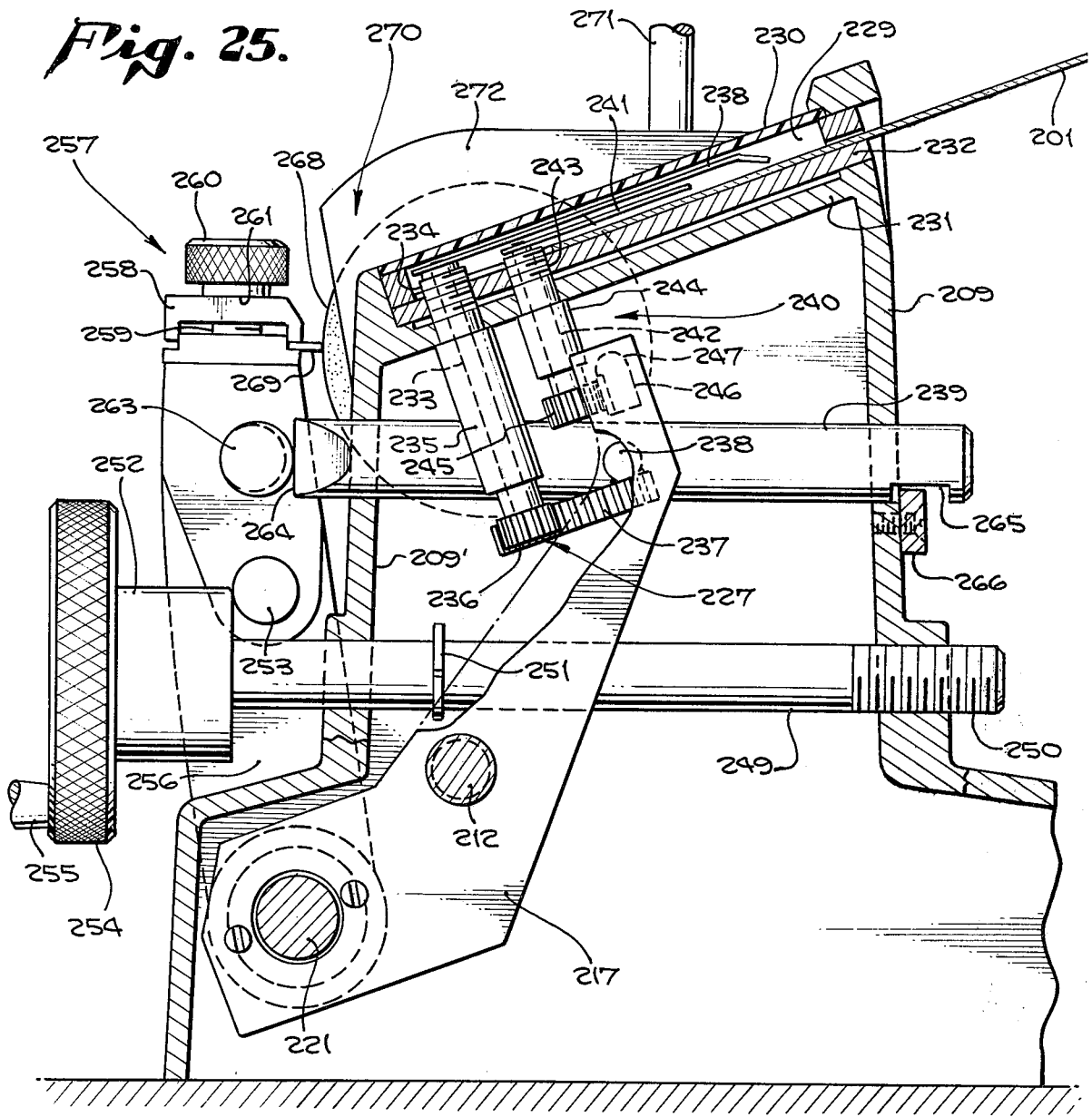
FIG. 25 is a view of the apparatus of FIG. 23 taken along plane XXV—XXV thereof.

Referring to both FIGS. 23 and 25, means 200 includes a housing 207 for housing the various components. Housing 207 includes a base 208 and upstanding sidewalls 209 enclosing an interior space 210. Means 200 further includes indexing means 211 for indexing the predetermined coded depths and spacings when cutting a blank key (i.e. duplicating a previously decoded key) on means 200. Such indexing means 211 includes a shaft 212 journalled for rotation in bearings 213, 214 mounted in suitable aligned apertures in sidewalls 209. As shown in FIG. 23, shaft 212 extends across the space 210 of housing 207 and terminates outside of housing 207 in a knurled 215 fixed to shaft 212 having a handle 216 for rotating knob 215 and thus shaft 212. A plate 217 (see FIG. 25) threadably engages a threaded section 218 on shaft 212 with spaced snap rings or stops 219, 220 at each end of threaded section 218 fixedly mounted on shaft 212. Plate 217 is apertured at its lower end to receive a shaft 221 therethrough. A sleeve 222 is fixed to both plate 217 and shaft 221. Shaft 221 is rotatable within a bearing 223 extending from sleeve 222 and is journalled in bearings 224, 225 also mounted in aligned apertures in sidewalls 209 below shaft 212. Shaft 221 extends out of housing 207 and terminates in a stop member 226 fixed to shaft 221 below knob 215. As will be discussed, as shaft 212 is rotated, shaft 221 moves in the direction of arrows 227 (FIG. 23) and is coupled to a housing member 256 for reasons to be discussed.

Indexing means 211 further includes depth cutting means 227 for providing a visual determination of the depth of cut made in a blank key on means 200. Such depth cutting means 227 includes a pointer 228 movable within an index card receiving chamber 229 formed by spaced upper walls 230, 231 at the top of housing 207 (see FIG. 25). Wall 230 may be transparent, such as clear glass or plastic, for providing a visual reading of card 201 inserting into chamber 229 as shown in FIG. 25. A support member 232 supports card 201 in chamber 229 and separates walls 230, 231.

Pointer 228 is fixedly secured at one end to a pivot shaft 233 rotatably mounted in a reduced portion 234 of a sleeve 235 extending through suitable aligned apertures in member 232 and wall 231. The lower end of shaft 233 terminates in a gear 236 which meshes with a gear rack 237 fixedly secured to a gear rack holder 238 mounted on a plunger 239 to be described.

Indexing means 211 further includes spacing means 240 for providing a visual determination of the spacing of the notches or cuts to be made in a blank key on means 200. Such spacing means 240 includes a pointer 241 also movable in space 229, preferably below pointer 228 as shown in FIG. 25, also fixedly secured at one end to a pivot shaft 242 rotatably mounted in a reduced portion 243 of a sleeve 244 extending through suitable aligned apertures in member 232 and wall 231. The lower end of shaft 242 terminates in a gear 245 meshing with a gear rack 246 (see also FIG. 23) fixedly secured to plate 217 by a gear rack holder 247 (FIG. 25). The notched portion 206 of card 201 straddles portion 243 of shaft 244 to properly align card 201 in means 200.

Duplicating means 200, as particularly contemplated in the present invention, includes key moving means 248 for moving a key into cutting engagement with notch cutting means, to be described, on duplicating means 200. In the exemplary embodiment, key moving means 248 includes a shaft 249 (FIG. 25) threaded at one end in a threaded aperture 250 in sidewall 209 of housing 207. A stop member 251, such as a snap ring, is fixedly secured to shaft 249 and adapted to abut against sidewall 209' when shaft 249 is rotated. Shaft 249 extends out of sidewall 209' and terminates in a sleeve member 252 which abuts against a bar 253 when shaft 249 is rotated. A knurled knob 254 is fixedly secured to sleeve member 252 having handle 255 for rotating shaft 249.

Key moving means 248 further includes a key holding member 256 fixedly secured at its lower end to shaft 221 (see FIGS. 23 and 25). That is, as shaft 221 is moved in the direction of arrows 227 in FIG. 23, member 256 is moved accordingly.

Duplicating means 200 further includes blank key positioning and holding means 257 for holding a blank key in a predetermined position for cutting, as will be discussed. In the exemplary embodiment of the invention, blank key positioning and holding means 257 includes a movable clamping plate 258 (see FIG. 25) having a threaded bolt 259 extending therethrough, bolt 259 being threadably mounted in a threaded aperture in member 256. A knurled knob 260 is threaded on the upper end of bolt 259 and has a shoulder 261 bearing against clamping plate 258. As knob 260 is threaded or rotated on bolt 259, plate 258 is clamped against the upper surface of member 256 to thereby clamp a blank key therebetween.

Figure 26:
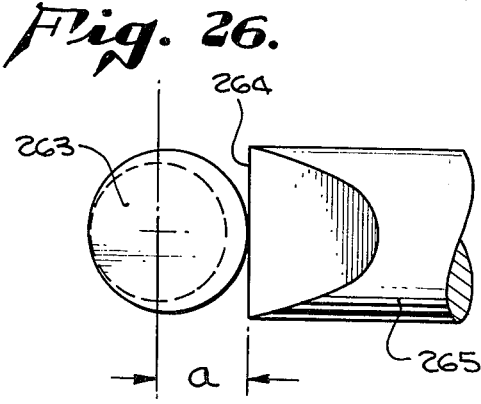
FIGS. 26 and 27 are detailed views of a portion of the apparatus of FIGS. 23 and 25 showing differing positions thereof.
Figure 27:
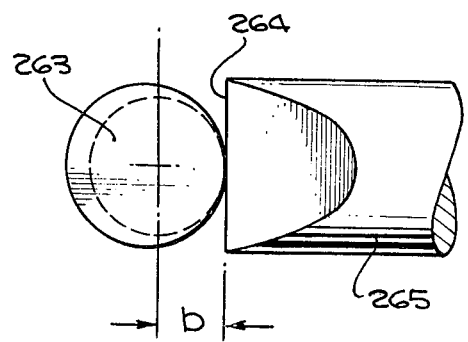

Blank key positioning and holding means 257 further includes means 262 for properly positioning a blank key in means 200 prior to cutting. In the exemplary embodiment of the invention, such means 262 includes an eccentrically mounted rod 263 rotatably mounted in member 256 above rob 253. As can be seen in FIGS. 26 and 27, eccentric rod 263, as indicated by the dotted lines, is rotatable to present a varying distance between the outer periphery thereof and the knife end 264 of a plunger rod 239. That is, the maximum difference is the difference between spacing $a$ and spacing $b$ as can be seen by comparing FIGS. 26 and 27; rod 263 is of course rotatable between such maximum difference to provide varying distances between rod 263 and edge 264.

Plunger rod 239 extends through suitable aligned apertures in sidewalls 209, 209' in FIG. 25 and is notched at one end at notch 265 to provide a stop when it engages a stop plate 266 mounted on sidewall 209. As previously discussed, plunger rod 239 is coupled to gear rack 237 by means of holder 238.

Figure 28:
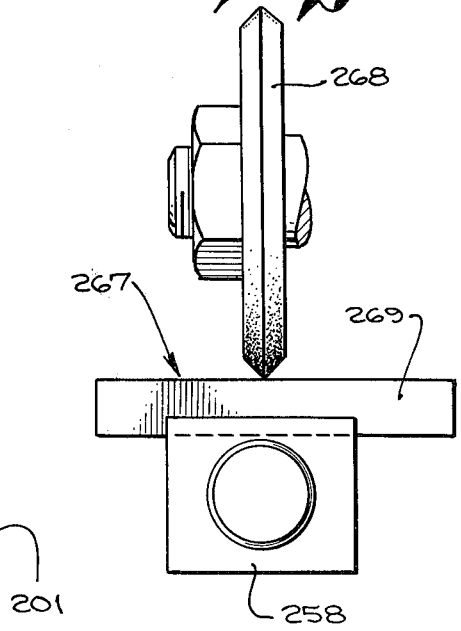
FIG. 28 is a detailed view of another portion of the apparatus of FIGS. 23 and 25.

Means 262 further includes gauging means 267 for gauging the distance between the grinding wheel 268 (to be discussed) and the blank key to be duplicated on means 200. As shown in FIG. 28, gauging means 267 includes a gauge 269 which is correlated to the width of the shank of the key being duplicated. That is, keys of different manufacturers have shanks of differing widths. Selection of the proper known gauge is made, as for example from formation recorded on index card 201, and a proper gauge 269 is selected and clamped in clamping plate 258 as previously discussed. As will be discussed, eccentric rod 263 is rotated to provide an initial zero depth of pointer 228 prior to cutting when the proper gauge 269 is placed or clamped in holder 258.

Duplicating means 200, in the exemplary embodiment of the invention, further includes notch cutting means 270 for cutting notches in a blank key position in claimping plate 258. Such notch cutting means 270, in the exemplary embodiment of the invention, includes the aforementioned grinding wheel 268. As discussed hereinabove with respect to FIG. 11, a motor and pulley arrangement (described hereinabove at page 16, line 16 et seq) is coupled to grinding wheel 268 to rotate the same when a blank key is moved on means 200 as discussed hereinafter. Also, handle 271 is shown in FIGS. 23 and 25 and housing 272 may be pivotally mounted, as described hereinabove with respect to housing 171 to form part of the angle-of-cut indexing means (referenced by numeral 170 hereinabove) described in detail on page 17, lines 7 et seq and illustrated in FIGS. 15 and 19).

Although various phases of operations for duplicating a key have been heretofore described with respect to the various individual features thereof in the embodiment of FIGS. 23 through 28, a summary of the alternate key duplicating operations is as follows. Housing 207 may be preset as housing 171 described on page 18, lines 18 et seq. via handle 271 to provide a desired left, right or center cut as heretofore described. A preselected gauge 269 is clamped in clamping plate 258 and handle 255 rotated to turn shaft 249 thus abutting sleeve 252 against rod 253. Index card 201 related to the previously decoded key to be duplicated, is placed in slot or chamber 229, as previously discussed. Rotation of handle 255 moves gauge 269 against grinding wheel 268 as shown in FIG. 25. Eccentric rod 263 is rotated against knife edge 264 thereby varying the point of contact and shifting plunger rod 239 to either the left or right in FIG. 25 (the extent of movement of rod 239 controlled by notch 265' engaging stop plate 266). Since rack 237 is coupled to rod 239 through holder 238, gear 236 is rotated thus rotating pivot shaft 233 and pointer 228, carried thereby, across card 201 as shown in FIG. 24. Eccentric rod 263 is rotated until pointer 228 indicates a "zero" depth on card 201.

Knurled knob 215 is then rotated via handle 216 whereby shaft 212 is rotated which moves threaded plate 217 and shaft 221 to the left or right in FIG. 23. Since plate 217 is moved, rack 246, coupled thereto, rotates gear 245 and thus rotates pivot shaft 242 to move pointer 241 across index card 201. A quick reference to box 206 on index card 201 conveys to the operator the previously decoded dimensions for the spacing desired. For example, assume a key has been previously decoded to show a first notch spaced from the end a distance of 0.231 inches (i.e., a No. 1 coded spacing), pointer 241 is moved by rotation of shaft 212 to the No. 1 coded spacing on card 201 as shown in FIG. 24. Simultaneously, housing member 256 is moved to the left or right as indicated by arrows 227, to properly position the key clamped in plate 258 with respect to wheel 268. Thus, pointers 228 and 241 now visually indicate the initial or starting position of the notch to be cut, whether such notch is a center, right or left angle cut having been previously determined with housing 272 preset accordingly.

The motor for rotating wheel 268 is now started and knob 254 is rotated and a notch is cut in the key blank until pointer 228 sweeps across array 204 on index card 201 until the pointer 228 reaches the coded number (for example, in FIG. 24, pointer 228 has reached No. 2 and a reference to box 206 on card 201 would tell the operator how deep the actual cut is). Pointer 228 is moved due to the abutment of eccentric rod 263 against knife edge 264 of plunger 239 which, as previously discussed, moves rack and gear 236, 237 to rotate shaft 233 and thus move pointer 228. Sequential cuts may be made in the key blank, the total number of cuts, spacing therebetween the depth of cuts being recorded on card 201.

It can be seen from the foregoing that I have described an alternate method and apparatus for duplicating a previously decoded key wherein a key is decoded and the information derived from decoding the key is placed on an index card. This index card is inserted into key duplicating apparatus and the blank key holder thereof is properly aligned to receive a key blank of the type to e duplicated. The eccentric rod 263 permits gauges to be used to calibrate the key duplicating apparatus prior to cutting a key to compensate for keys of differing shanks, tolerances, wear of the grinding wheel 268, etc. The proper spacing and depth of cut is provided by a visual observation of the pointers 228, 241. In this manner, keys can be quickly and easily duplicated on means 200.

I claim:

1. Apparatus for duplicating a key having a shank portion with a plurality of spaced transverse notches of differing depths and spacing therebetween, said notches being coded to predetermined coded depth and spacing information therebetween, said apparatus comprising:
   housing means including a card receiving slot for removably receiving card means therein;
   coded indicia bearing card means removably and freely insertable into said slot in said housing means without connection to said housing means and having coded depth indicia thereon comprising a sequential index corresponding to at least a predetermined coded depth information for a singly type of key being duplicated;
   blank key holding and positioning means mounted adjacent said housing means for holding a blank key having a blank shank portion in a predetermined relationship thereon;
   notch cutting means mounted adjacent said housing means and adapted to cut a notch in said blank shank portion;
   key moving means mounted adjacent said housing means and said holding and positioning means for moving said key having said blank shank portion into cutting engagement with said cutting means; and
   indicating means provided within said housing means for continuously indicating the position of said notch cutting means and continuously indicating the depth of cut of the notches to be cut in said blank in comparison with said coded depth indicia on said card means.

2. Apparatus for duplicating a key having a shank portion with a plurality of spaced transverse notches of differing depths and spacing therebetween, said notches being coded to predetermined coded depth and spacing therebetween, said predetermined coded depth being recorded in a sequential index on coded indicia bearing means, said apparatus comprising:
   housing means for receiving said coded indicia bearing means therein;
   coded indicia bearing means insertable in said housing means having indicia thereon comprising a sequential index corresponding to said predetermined coded depth;
   blank key holding and positioning means associated with said housing means for holding a blank key having a blank shank portion in a predetermined relationship thereon;

notch cutting means associated with said housing means adapted to cut a notch in said blank shank portion;

key moving means associated with said housing means and said holding and positioning means for moving said key having said blank shank portion into cutting engagement with said cutting means; and indexing means on said housing means associated with both said indicia bearing means and said key moving means for indexing the depth of cut of the notches to be cut in said blank, wherein said indexing means includes a rotatable indexing drum having a plurality of aligned rows of spaced durm notches, the drum notches in one of said rows being coded to a predetermined spacing therebetween and all of the drum notches in one of said rows being coded to a differing predetermined coded spacing then the drum notches in other of said rows and further comprises:

an indicator arm movable across said sequential index on said indicia bearing means and an indexing pin having an end portion conforming to said drum notches, said end portion of said pin being normally biased toward said drum notches and generally coaxially aligned therewith, said indicator arm being fixedly secured to a shaft pivotally mounted in said housing means, and gearing means operably connected to both said shaft and said indexing pin for moving said indicator arm across said sequential index when said end portion of said pin conformably enters one of said aligned drum notches and said blank key is cut by said cutting means.

3. The apparatus of claim 2 further including angle-of-cut indexing means associated with said key holding means for indexing the angle of cut made on said key having said blank shank portion by said cutting means.

4. The apparatus of claim 3 wherein said angle-of-cut indexing means includes means associated with both said housing means and said cutting means for selectively moving said cutting means into a first fixed position with respect to said key positioning and holding means whereby a right angle of cut is made by said cutting means on said key having said blank shank portion, into a second fixed position with respect to said key positioning and holding means whereby a left angle of cut is made by said cutting means on said key having said blank shank portion, and into a third fixed position with respect to said key positioning and holding means whereby a straight angle of cut is made by said cutting means on said key having said blank shank portion.

5. The apparatus of claim 1 wherein said coded indicia bearing card means also has coded spacing indicia thereon comprising a second sequential index corresponding to said predetermined coded spacing information of the single type key being duplicated and said indicating means includes visually observable indicator means operatively connected to said key moving means and movable with respect to said indicia on said coded indicia bearing means to visually indicate the coded spacing and depth of cut on a blank key positioned in said holding and positioning means for said single type key being duplicated.

6. The apparatus of claim 1 wherein said indicator means includes a first pointer movable across the coded depth indicia on said indicia bearing means visible from the exterior of said housing means, said first pointer being pivotally mounted on a first shaft rotatably connected to a first movable member mounted in said housing, said first movable member operatively engaging said key moving means with movement of said key moving means in a key cutting direction rotating said first shaft to thereby move said first pointer.

7. The apparatus of claim 6 wherein said movable member is a plunger rod having one end movable between fixed spaced positions with respect to said housing and its other end having an edge abutting against a member fixed to said key moving means.

8. The apparatus of claim 7 wherein said member fixed to said key moving means is eccentrically mounted member adapted to move said movable member between said spaced positions.

9. The apparatus of claim 8 wherein said eccentrically mounted member is a rotatable rod rotatable off center from its axis.

10. The apparatus of claim 8 further including gauging means associated with said blank key holding and positioning means insertable in said holding and positioning means for calibrating the position of said eccentrically mounted member with resect to said movable member and thereby the position of said first pointer with respect to said coded depth indicia prior to cutting a notch in a blank key.

11. The apparatus of claim 5 wherein said indicator means includes:

a first pointer movable across the coded depth index on said indicia bearing card means visible from the exterior of said housing means, said first pointer being pivotally mounted on a first shaft rotatably connected to a first movable member mounted in said housing, said first movable member operatively engaging said key moving means whereby movement in a key cutting direction of said key moving means rotates said first shaft to thereby move said first pointer and a second pointer movable across the coded spacing indicia on said indicia bearing card means visible from the exterior of said housing means, said second pointer being pivotally mounted on a second shaft rotatably connected to a second movable member threadably mounted on a shaft journalled for rotation in said housing, and a handle connected to said last-mentioned shaft for rotating the same, said last-mentioned shaft being coupled to said key moving means, whereby rotation of said last-mentioned shaft moves said key moving means and said second pointer across said coded spacing indicia, the degree of movement of said second pointer across said coded spacing indicia being correlated to the degree of movement of said key moving means by said last-mentioned shaft in an indexing direction between spaced cutting locations.

* * * * *